United States Patent [19]
Braun

[11] Patent Number: 5,455,762
[45] Date of Patent: Oct. 3, 1995

[54] MOTOR CONTROLLER HAVING MULTIPLE COMMAND SOURCES

[75] Inventor: Scott D. Braun, Port Washington, Wis.

[73] Assignee: Allen-Bradley Company, Inc., Milwaukee, Wis.

[21] Appl. No.: 192,215

[22] Filed: Feb. 4, 1994

[51] Int. Cl.[6] ................................... G06F 15/00
[52] U.S. Cl. ............... 364/140; 364/131; 364/571.07
[58] Field of Search ................... 364/140–146, 364/131–138, 571.04, 571.07; 375/1; 318/685, 686

[56] References Cited

U.S. PATENT DOCUMENTS

| | | | |
|---|---|---|---|
| 4,847,544 | 7/1989 | Goldberg | 318/686 |
| 4,995,053 | 2/1991 | Simpson et al. | 375/1 |
| 5,253,159 | 10/1993 | Bilas et al. | 364/140 |
| 5,323,307 | 6/1994 | Wolf et al. | 364/140 |

*Primary Examiner*—Paul P. Gordon
*Assistant Examiner*—Thomas E. Brown
*Attorney, Agent, or Firm*—Keith M. Baxter; John J. Horn; H. F. Hamann

[57] ABSTRACT

A motor controller receives commands from multiple command sources, the commands having different types, and dynamically allocates an ownership of each command type to a particular command source based on the commands received. In one embodiment, the allocation is according to the first command source to request the command type when there is no other ownership of the command type. A masking table provides the ability to lock out any particular command type from a command source regardless of the ownership. Each command source receives a unique address from a connector system connecting it to the motor controller and, when first connected, responds to a polling by the motor controller with its address and control source type permitting multiple control sources to be automatically configured and accommodated by the motor controller.

10 Claims, 4 Drawing Sheets

FIG. 4

| | NOT USED | 6 | 5 | 4 | 3 | 2 | 1 | LOCAL | |
|---|---|---|---|---|---|---|---|---|---|
| 54 | 0 | 0 | 0 | 0 | 0 | 0 | 0 | 0 | STOP OWNER |
| | 0 | 0 | 0 | 0 | 0 | 0 | 0 | 0 | START OWNER |
| | 0 | 0 | 0 | 0 | 1 | 0 | 0 | 0 | JOG OWNER |
| | 0 | 0 | 0 | 0 | 0 | 0 | 0 | 0 | DIRECTION OWNER |
| | 0 | 0 | 0 | 0 | 0 | 0 | 0 | 0 | REFERENCE OWNER |

FIG. 5

| | NOT USED | 6 | 5 | 4 | 3 | 2 | 1 | LOCAL | |
|---|---|---|---|---|---|---|---|---|---|
| 55 | 1 | 1 | 1 | 0 | 1 | 1 | 1 | 1 | LOGIC MASK |
| | 1 | 1 | 1 | 1 | 0 | 1 | 1 | 1 | START MASK |
| | 1 | 0 | 1 | 1 | 1 | 1 | 1 | 1 | JOG MASK |
| | 1 | 1 | 1 | 1 | 1 | 1 | 1 | 1 | DIRECTION MASK |
| | 1 | 1 | 1 | 1 | 1 | 1 | 1 | 1 | REFERENCE MASK |

MOTOR CONTROLLER HAVING MULTIPLE COMMAND SOURCES

FIELD OF THE INVENTION

The present invention relates to industrial motor controllers and in particular to a motor controller that may receive commands from multiple sources.

BACKGROUND OF THE INVENTION

Simple control of industrial AC motors requires only the connection and disconnection of the motor windings from a source of AC power. This may be performed by an electromagnetic relay (contactor) which switches the large motor currents in response to a smaller current energizing its electromagnetic actuator. An 'ON' pushbutton switch, when pressed, allows current flow which closes the contactor. An auxiliary set of latching contacts in the contactor hold the contactor in the 'ON' state even when the 'ON' pushbutton switch is no longer closed. A STOP pushbutton switch interrupts the current flowing through the electromagnetic actuator to allow the contactor to open turning the motor off. Often the contactor is associated with an overload relay, the latter which opens the contactor if motor currents exceed a predetermined limit, indicating an overload.

With advances in solid state electronic devices, motor controllers have been developed which provide additional and more sophisticated control of the motor. In such motor controllers, the power to the motor passes through a set of solid state switches, such as thyristors, which may modulate the AC power to adjust the motor voltage and current. Such modulation, for example, can be used to "soft start" the motor by slowly increasing the voltage to the motor, as the motor is started. A soft start reduces current consumption and torque during start-up and thus avoids excessive current demands on the electrical power distribution system.

Such motor controllers can also provide a dynamic braking action by applying DC or alternating current to the motor so as to slow down the motor at a faster rate than would occur simply by disconnecting power.

With the availability of microprocessors, additional motor functions may be implemented. Thus, even for smaller motors, it is typical to find the simple start and stop pushbutton augmented by additional controls providing commands such as jog, change motor direction and change motor velocity.

Frequently, it is desirable that a motor be controllable from a number of different places for the convenience of the machine operators. In automated processes, it is also desirable that the motor controller also receive commands from a programmable logic controller (PLC) or other industrial computer.

Previously, multiple control sources, either pushbuttons or a combination of pushbuttons and other controllers, have been connected together to provide commands to a single motor controller. Conflicts among these multiple control sources are prevented by permitting the motor controller to accept certain command types only from a single predetermined command source. For example, a 'JOG' command might be accepted only from a single pushbutton panel. Changing the command source for a given command function requires reprogramming of the motor controller by the user.

Although this approach significantly limits flexibility inherent in multiple command sources and increases the complexity of configuring the controller, it has the important advantage of ensuring a clear control hierarchy and eliminating the possibility of erroneous interpretation of competing conflicting commands.

SUMMARY OF THE INVENTION

The present invention provides a method of fully enjoying the flexibility provided by multiple command sources—any source can provide any command to the motor controller. The problem of conflicting commands is eliminated by dynamically allocating ownership of each command type among the different command sources.

Specifically, a motor controller of the present invention, providing AC power to an electrical motor, may receive commands from more than one command source, each command source producing command signals, representing a desired control of the motor, and having a command type. A power control unit receives the command signals and adjusts the AC power to the motor according to at least one command signal.

The power control unit includes an electronic computer having a memory for storing an ownership table that dynamically relates the command sources to at least one command type. The memory also stores a program controlling the electronic computer to receive the command signals from the command sources, identify the command sources associated with each command signal, and adjust the relationship of the ownership table (between command sources and command types) based on the received command signals and their identified command sources. The program then causes the power control unit to respond only to command signals that the ownership table indicates are related to the identified command source.

Thus, it is one object of the invention to associate each source of command signals to a particular command type on a dynamic basis and based on the received command signals themselves and thereby allow all command sources to provide command signals of any command type without laborious reprogramming of the motor controller.

The ownership table may be changed by the received command signals so as to link a given command source to a given command type according to the order in which the command signals are received by the various sources. The first command source invoking a given command type takes ownership of that type for as long as it continues to perform the control.

Thus, it is another object of the invention to provide a simple rule for allocating among competing command sources. A first-in time rule resolves conflicts between command signals.

The memory of the electronic computer may also store a masking table statically relating the command sources to a predetermined command type. The program may cause the power control unit to respond to a command signal only if the masking table indicates that the command type of the command signal is not related to an identified command source indicated by the masking table.

Thus, it is another object of the invention to flexibly limit the dynamic allocation of the ownership table by blocking certain command sources from providing certain command types.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

BRIEF DESCRIPTION OF THE DRAWINGS

FIG. 4 is a simplified representation of a table stored in a memory of the microprocessor of FIG. 1 indicating ownership of each command type by a particular command source; and FIG. 5 is a figure similar to that of FIG. 4 showing a table providing for masking of particular command types from particular command sources.

DETAILED DESCRIPTION OF THE PREFERRED EMBODIMENT

Figure 1:
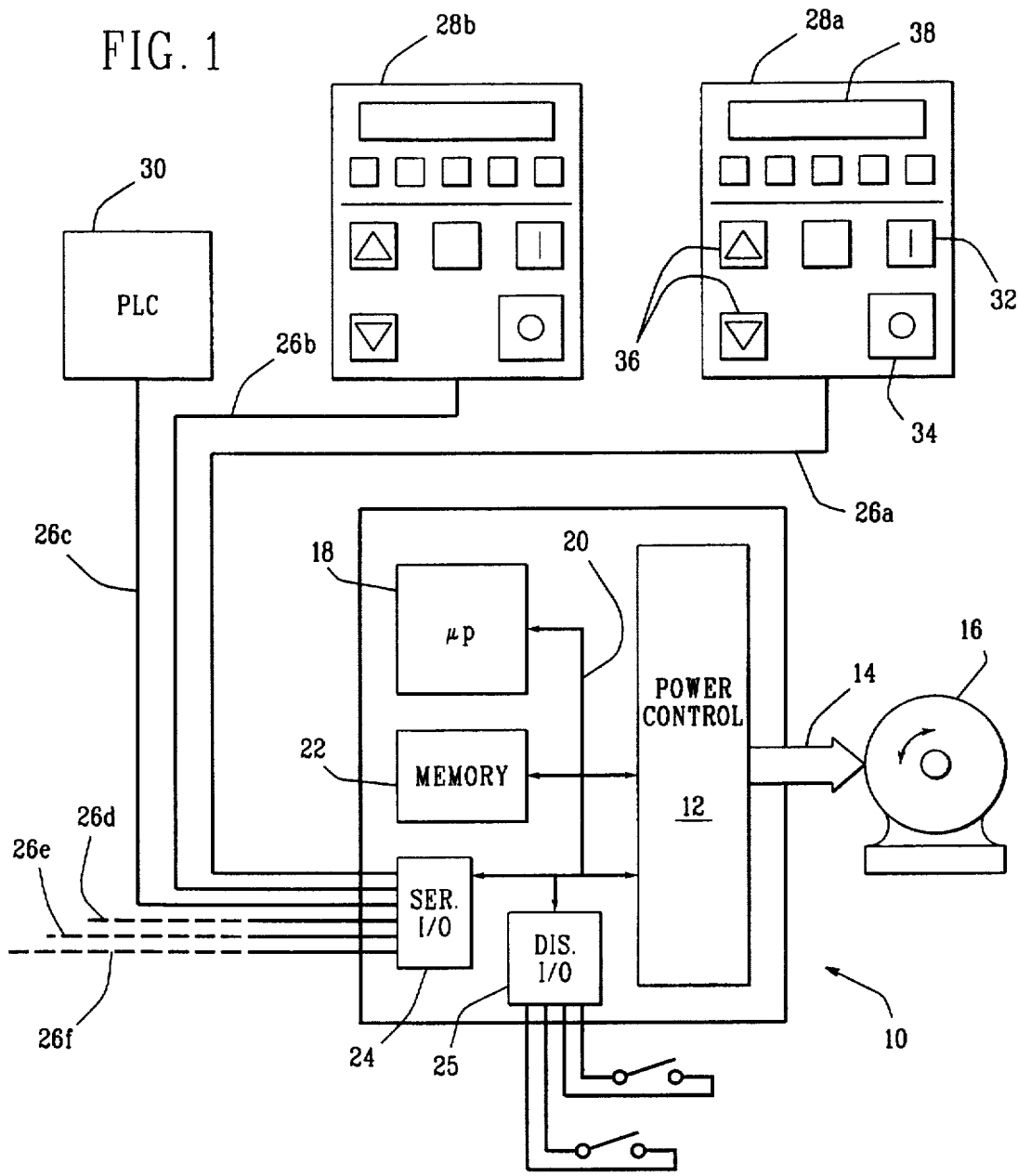
FIG. 1 is a schematic block diagram of a motor controller providing power to a motor based on commands received by the microprocessor through serial input/output circuitry from command sources such as pushbutton panels or a programmable logic controller.

Referring to FIG. 1, a motor controller 10 includes power control electronics 12 which provide voltage controlled three phase power 14 to a motor 16. The power control electronics 12 switch line AC so as to remove "notches" from the line AC voltage waveforms controlling the effective voltage of the modified three phase power 14 or to reverse the polarity of the line AC applied to the motor 16.

The power control electronics 12 are controlled by the microprocessor 18 which communicates with the power control electronics 12 via an internal bus 20. The internal bus 20 also provides communication between the microprocessor 18 and computer memory 22 and serial and discrete input/output circuitry 24 and 25.

Serial input/output circuitry 24 provides six bus connector locations 26(a) through 26 (f), each one of which may be connected to a single external command source, pushbutton panels 28 or programmable logic controllers 30, providing a source of commands to the motor controller 10. In the example shown in FIG. 1, two pushbutton panels 28(a) and 28(b) are connected to connector locations 26(a) and 26(b) respectively. A programmable logic controller 30 is connected to connector location 26(c). Connector locations 26(d), 26(e), and 26(f) having no connections in the present example, however, may receive a pushbutton panel 28 or PLC 30 or other command source capable of transmitting command messages to the motor controller 10 as will be understood from the description to follow.

Each pushbutton panel 28(a) and 28(b) includes a set of pushbutton switches 36, including an ON pushbutton 32, an OFF pushbutton 34, together with an alphanumeric display 38. Generally, a user may press any of the pushbuttons 36 to produce a command signal transmitted to the motor controller 10 via one of connector locations 26. The command signal so produced may initiate a predetermined controlling of motor 16 via power control electronics 12. The particular control action may be as simple as connecting or disconnecting power from the motor 16 or may involve a more complex control of the voltage to the motor 16 according to well known techniques. The alpha-numeric display 38 may present information from the motor controller 10 to the user such as the existence of a fault condition in the motor controller 10.

Alternatively, the programmable logic controller 30 may provide command signals to the motor controller 10 via connector location 26(c) in response to an internally executed control program responding to other inputs and outputs to the programmable logic controller 30. Generally, the command signals from the programmable logic controller 30 will be of a different format than those of the button panels 28.

The command signals generated by either the pushbutton panels 28(a) and 28(b) or the programmable logic controller 30 are asynchronous and independent. Thus, more than one conflicting command signal may be transmitted to the motor controller 10 within a predetermined time period, such command signals, for example, instructing the motor controller 10 to simultaneously run the motor in opposite directions. This potential conflict is addressed by a program running in the microprocessor 18, as will be described further below.

Figure 2:
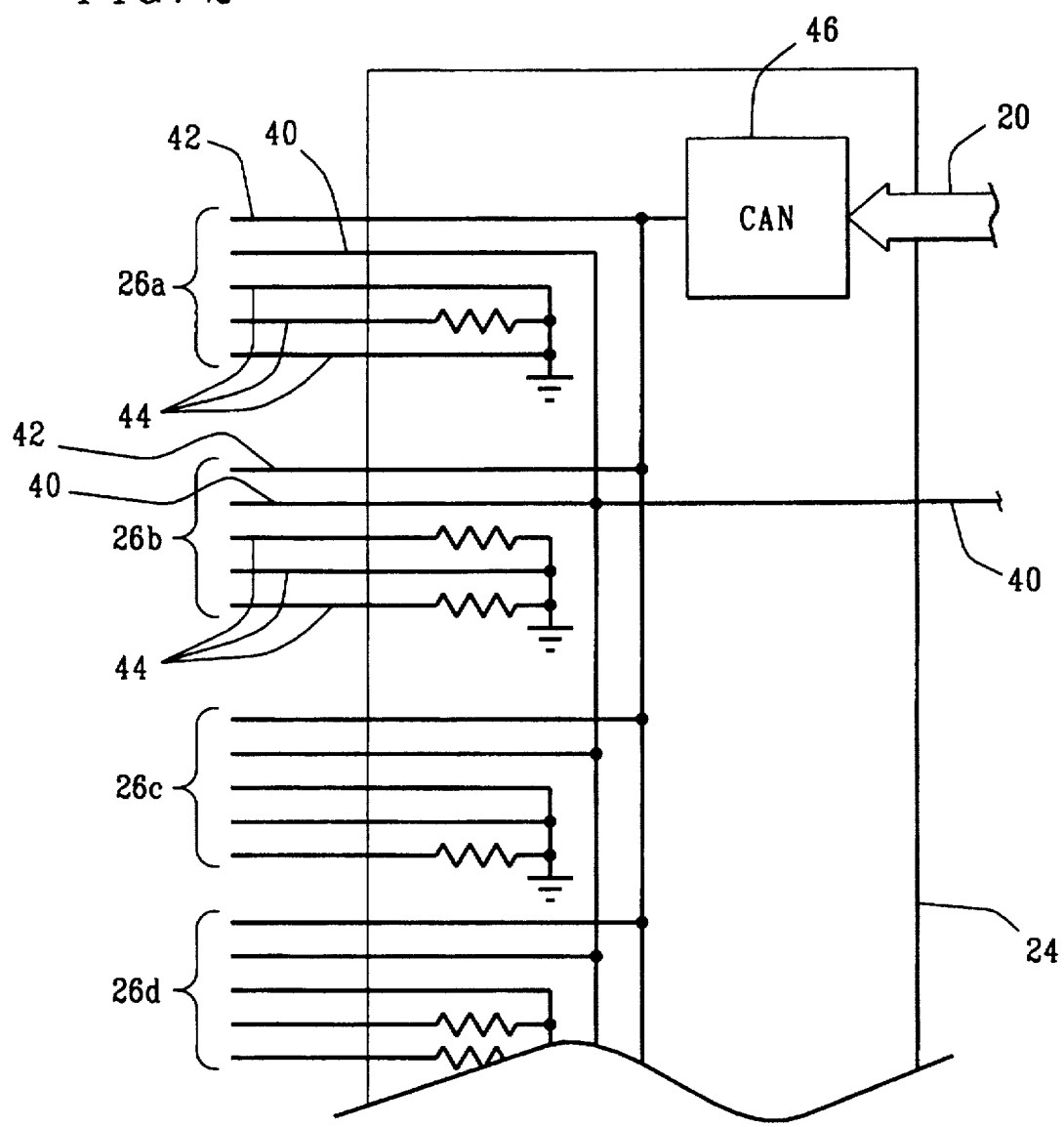
FIG. 2 is a block diagram of the serial input/output circuitry of FIG. 1 showing the serial data in conjunction with the address and coding lines used to distinguish between the various connected command sources.

Referring also to FIG. 2, the serial input/output circuitry 24 provides to the command sources 28 and 30, via each connector location 26(a) through 26(f), power, serial data, and address information, the latter which is dependant on the particular connector location 26.

The power is supplied by power supply lines 40 including power and ground wires. The power supply lines 40 provide sufficient power to operate the pushbutton panels 28 which include internal circuitry for providing command signals in the serial format for transmission over serial data lines 42, and for operation of the alphanumeric displays 38.

The serial data is provided by serial data lines 42 from a specialized controller area network (CAN) communication circuit 46. The CAN circuit 46 provides communication protocols for receiving and transmitting serial data between the motor controller 10 and its command sources 28 or 30 according to the CAN standard as is well known in the art. In particular, the CAN protocol defines the algorithms and requirements which comprise the Media Access Control (MAC) and physical signaling layers of the ISO/OSI 7-Layer Model for Data Communication Networks. The CAN protocols are specified in ISO document ISO/TC22/SC3/WG1 as authored by Robert Bosch GmbH, hereby incorporated by reference.

Generally the CAN standard allows for the communication of asynchronous digital messages along a twisted pair of conductors such as may comprise links 42 at speeds of up to 1 Mbit/sec. The CAN protocol specifies a zero to eight byte data message including an twelve bit arbitration field which determines priority when two nodes need to transmit messages at the same time. Integrated circuits supporting the CAN protocol are commercially available from a number of manufacturers including Intel Corporation having offices in Santa Clara, Calif.

The address information, which helps identify each command source 28 or 30, is provided by three pin identification (ID) lines 44. One or more of the conductors in the pin ID lines is connected to ground through a resistance. Different ones of the conductors are connected to ground in different connector locations 26 so that a measuring of the impedance to ground on these conductors, by the connected command sources 28(a), (b) or 30, provides a unique three digit binary number that may be used as the address of that command source. The three conductors of the pin ID lines provide for up to eight addresses. Two of these addresses, zero and seven, are not employed by external command sources and hence only six connector locations, 26(a) through 26(f), are employed.

The three bit binary data conveyed by the pin ID lines 44 is read by the attached command sources 28(a), 28(b) or 30 which then incorporates this address data into serial communication on serial data lines 42 allowing the motor controller 10 to identify the source of any command message as is necessary for the ownership allocation of the present invention.

Figure 3:
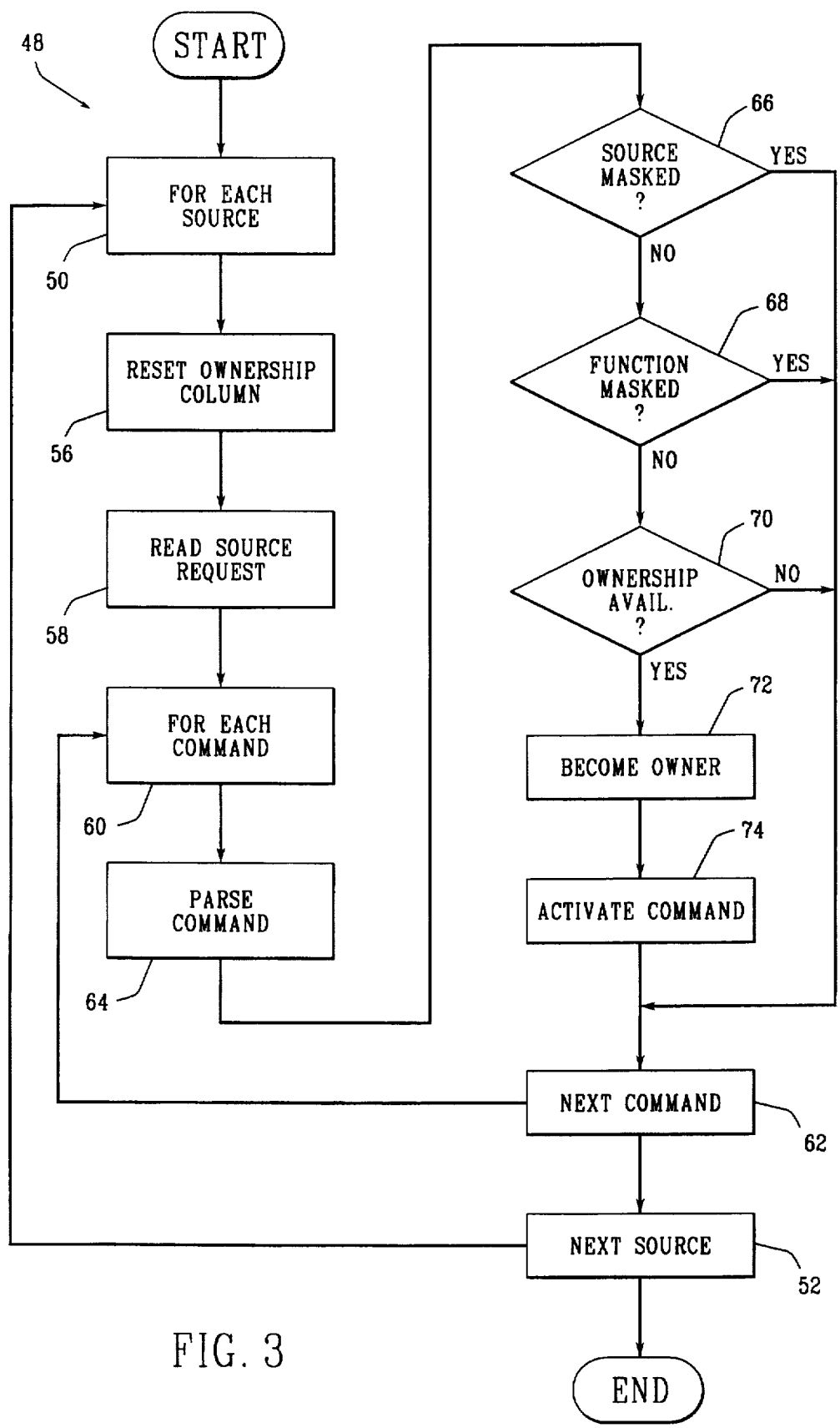
FIG. 3 is a program performed by the microprocessor of FIG. 1 for interpreting command signals from the command sources and controlling the motor accordingly.

Referring now to FIGS. 1, 2 and 3, the microprocessor 18 of the motor controller 10 processes commands from the command sources 28 and 30 via a program 48 contained in memory 22.

In the first stage of this program 48, indicated by process blocks 50 and 52, a logical FOR . . . NEXT loop is created in which each command source 28 or 30 is sequentially scanned according to the order of its address derived from the pin ID lines 44. The first such command source having the address of zero is the discrete input/output circuitry internal to the motor controller 10. This discrete input/output circuitry 25 provides the same commands as command sources 28 and 30 except that it is directly connected to the motor controller 10 without the need for serial communication.

Next the external command sources 28 or 30 are scanned. The connector locations 26(a)–(f) having command sources 28 or 30 connected to them is determined earlier by a background query message sent along each connector location 26(a)–(f) to see if a command source is connected to that connector location 26. If a command source 28 or 30 is connected to that connector location and receives the inquiry from the motor controller 10, it responds with a request to join the active command sources and by transmitting a code indicating the type of command source that it is. The pushbutton panels 28 transmit one type-code and the PLC's 30 transmit a second type-code. The type codes indicate the message format that the command sources 28 or 30 expect and the message format of the command signals that they may transmit. Differences in the message formats is accommodated by an interpretation step performed before parsing of the command signal as will be described below. As a result, both of the effective automatic addressing provided by the pin ID lines 44 and the format indicating type-code provided by the command sources 28 or 30, the motor controller system is auto-configuring after connections are made between connector locations 28(a) and the particular command sources 28 or 30 to be used. That is, there is no need for the user to provide information to the program 48 of the motor controller 10 indicating what command sources 28 or 30 are present.

Each command received from a command source 28 or 30 is represented by the first two of four serially transmitted 8-bit bytes received along the serial lines 42 by the CAN circuit. The first byte, for a command source 28, is a generic command, such as STOP, and the second byte indicates various forms of that generic command, such as a particular type of STOP (e.g.,soft STOP, DC brake STOP, or a coasting STOP). Not all motor controllers 10 will be able to provide each of these command types and if the particular command type indicated by the second attribute byte is not available, the motor controller 10 will revert to a default command indicated by the first command byte.

For command source 30, a different binary pattern is transmitted to the motor controller 10, and decoded in the motor controller 10, to provide the functional equivalent of the generic command and the particular form of the generic command that is provided directly by command sources 28. Similarly, the discrete input/output circuitry 25 provides a yet different binary pattern that is also decoded to generic type commands by the motor controller 10.

The command types are those typically found in a motor controller and include STOP, START, JOG, DIRECTION and REFERENCE, such as are well known in the art. As the names imply, STOP and START control the stopping and starting of the motor 16. JOG provides for a momentary (non-latching) starting of the motor 16 for as long as the command is issued. DIRECTION changes the direction of motor rotation and REFERENCE selects among predetermined analog values used in other control functions, such as velocity.

Referring now also to FIG. 4, an ownership table 54 held in memory 22 relates each command source 28 or 30, by address (e.g., 0–7) to a command type. Each command type may be represented as a row of an ownership table 54 whereas the columns may represent the addresses of the particular command sources. A given element of the ownership table 54, identified by a given row and column, may hold a one or zero, the zero indicating there is no "ownership" of the given command source 28 or 30 of the command type and a one indicating that the command type is owned by the command source 28 or 30.

Generally, a given command type may be either singly owned or multiply owned depending on whether there is an intrinsic conflict expected according to the command type of the command source. For example, STOP is ordinarily commonly owned, that is, any command source may issue a STOP command for practical reasons. Command types such as STOP, CLEAR FAULT and JOG can have multiple owners whereas command types such as SET DIRECTION, SET ACCELERATION, SET DECELERATION, SET REFERENCE will typically have only one owner at a time. The classification of a command type as single or multiple owner is predetermined by the logic of the program 48 as will be described.

The relationship indicated by the ownership table 54 is the legitimacy of a given command source 28 or 30 issuing a given command type. As shown, the command source with address 3 is indicated to be the owner of the JOG command by the inclusion of a one in the intersection of the relevant row and column for this address and command type. This one indicates an ownership of the JOG command type by the third command source 28 attached to connector location 26(b).

Referring again to FIG. 3, then, for each command source 28 or 30 represented by a single column in the ownership table 54, the column is first reset so that all its elements are zero as indicated by process block 56.

At succeeding process block 58, the microprocessor 18 issues a command to a given attached command source 28 or 30 inquiring as to whether the command source has a command signal for the motor controller 10. If so, that command signal is read at process block 60. Based on the previously transmitted type-code, the program at process block 60 interprets all command signals from either command source 28 or 30 into a common form that may be later parsed by the parser of process block 64.

If there is more than one command signal, for each such command signal, the program loops according to process block 60 and 62 which for a second embedded FOR . . . NEXT loop to sequentially examine each such command signal.

The first step in that examination, indicated by process block 64, is the parsing of the command signal to identify its command type and hence its particular row of the ownership table 54.

Referring now to FIG. 5, a masking table 55, similar to ownership table 54 shown in FIG. 4, relates each command source 28 or 30 to a particular command type as the ownership table 54. In this case the relation, also indicated by ones and zeros in elements of the table 55, does not indicate ownership but rather indicates a masking or "locking out" of a given command type from a given command source 28 or 30. For example, as shown, the command source with address 6 is masked from the JOG command as indicated by a zero in the intersection between the column of command source 6 and the row of the JOG command type. This masking, as will now be described, causes the motor controller 10 to ignore any JOG command type initiated by command source 6.

The masking table 55 also incorporates a logic mask row not related to any one command type but to all command types. In the logic masking row, a zero indicates that all command types from the given command source should be masked. Hence as shown, the zero in the intersection of the logic mask row and the column of command source 4 indicates that no command type from command source with address 4 should be acted on by the motor controller 10. No row is provided for the STOP command because it is desirable that the STOP function not be maskable.

Referring also now to FIG. 3, after the command signal is parsed at process block 64, the command type of the command is known and hence the row of ownership table 54 and masking table 55 may be determined. The column of either table 54 or 55 is also known from the transmitted address of the particular command source 28 or 30 derived from its pin ID lines 44. Hence a unique element in each of the ownership table 54 and masking table 55 may be isolated.

At decision block 66, succeeding the parsing of the command at process block 64, the logic mask row of the masking table 55 is examined. For example, if command source address 2 is being scanned per block 50, the element at the intersection of the logic mask row and second column of the masking table 55 is examined. In this example this element is one, so an acceptance of the entire command source 28(a) at address 2 is indicated. If, however, a command source 28 or 30 is masked for all command types, as indicated by the logic mask row, the program proceeds immediately to examine the next command message, if any, by branching to the NEXT command block 62 which loops back to block 60 to receive and parse the next command.

If the entire command source is not masked as determined by decision block 66, the program proceeds to decision block 68.

At decision block 68, the masking table 55 is examined at the identified element to see if that command source is masked for the particular command type of the received command signal. For example, if command source address 2 is being scanned per block 50 and the command parsing at process block 64 indicates that a START command has been provided by command source address 2, the element indicated by the row and column of these command sources and command types is examined to see if that command type is allowable.

If not, the program again branches to the top of the next command of block 62 as previously described. If so, however, the program proceeds to decision block 70 and the availability of ownership for that command type is checked per the ownership table 54 at decision block 70.

Ownership of a command type is considered to be available if the particular command type is a multiple owner command type, as predetermined based on the physical meaning of the command type, OR if the command type is a single owner command type AND no other command source has ownership as indicated by a scanning across of the row of that command type to determine if there are any other ones set in that row.

If ownership is available, as indicated by process block 70, the program proceeds to process block 72 and the ownership table 54 is updated by placing a one in the appropriate row and column indicating the particular command being activated and thus the new ownership of that command type by the command source.

Next, at process block 74, the command, as parsed at process block 64, is activated with the microprocessor 18 providing instructions to the power control electronics 12 to execute the particular command.

The program proceeds directly to the NEXT command block 62 of the FOR . . . NEXT loop of process blocks 60 and 62 until all commands received from the particular command source have been parsed and checked for ownership per process block 64 through 74. When all such commands for that particular command source have been examined, the program proceeds to the NEXT source block 52 of the FOR . . . NEXT loop of process blocks 50 and 52 and the next command source is scanned for possible command messages.

This loop of scanning each command source embraced by process blocks 50 and 52 is repeated continuously at times when the motor controller 10 is not otherwise employed by affecting particular control tasks or establishing the connections of command sources to the connector locations 26 and their types.

The above description has been that of a preferred embodiment of the present invention. It will occur to those that practice the art that many modifications may be made without departing from the spirit and scope of the invention. For example, other new command types, as they are developed may be incorporated into the ownership table and masking table of the present invention by extension of the techniques herein described. It is evident that other command sources than panels and logic controllers may also provide commands to the motor controller under this system. In order to apprise the public of the various embodiments that may fall within the scope of the invention, the following claims are made.

I claim:

1. A motor controller providing power to an electrical motor, the motor controller comprising:
   at least two command sources producing command signals of control types, the command signals representing a desired control the motor;
   a power control unit communicating with the command sources to receive the command signals and adjust the power according to at least one command signal, the power control unit including an electronic computer having a memory storing;

(1) an ownership table dynamically relating the command sources to at least one control type;

(2) the electronic computer operating according to a stored program to provide means for:

(a) receiving the command signals from the command sources;

(b) identifying the command sources associated with each command signal;

(c) adjusting the relationship of the ownership table between command sources and control types based on the received command signals and their identified command sources;

(d) causing the power control unit to respond to the command signals by adjusting the power only if the ownership table indicates that the control type of the each command signal is related to the identified command source.

2. A motor controller as recited in claim 1 wherein the means (c) relates a given command source type to a given command by identifying the first command source to produce a command signal of the given command type after no command source is producing a command signal of the given command type.

3. A motor controller as recited in claim 1 wherein one command signal type is a motor stop type representing the desired stopping of the motor; and wherein the ownership table relates all command sources to the motor stop type.

4. A motor controller as recited in claim 1 wherein the memory also stores:

(3) a masking table statically relating the command sources to predetermined control types;

and wherein the means (d) causes the power control unit to respond to the command signals by adjusting the power only if:

A. the ownership table indicates that the control type of each command signal is related to the identified command source as indicated by the ownership table; and B. if the masking table indicates that the control type of the each command signal is not related to the identified command source.

5. A motor controller as recited in claim 1 wherein the masking table may relate a given command source to more than one control type thereby effectively blocking more than one command signal from that command source.

6. A motor controller as recited in claim 1 wherein at least one command source is a pushbutton module with different pushbuttons producing different command signals.

7. A motor controller as recited in claim 1 wherein at least one command source is an industrial controller operating according to a stored program.

8. A motor controller as recited in claim 1 wherein each command source may be removably attached to the power control unit by electrical connectors and wherein step (b) of the program identifies each command source by a unique address associated with the electrical connector to which the command source is attached.

9. A motor controller as recited in claim 8 wherein the electrical connector includes a plurality of pins and wherein the unique address is encoded in the line of the pins to voltage sources.

10. A motor controller as recited in claim 1 wherein the command sources are of at least two different types providing different input signals to the motor controller and wherein the program controlling the electronic computer:

solicits from each command source a type code related to its type; and prior to step (a) interprets a received input signals according to the type to produce the command signals.

* * * * *